United States Patent
Liu et al.

(10) Patent No.: US 6,913,714 B2
(45) Date of Patent: Jul. 5, 2005

(54) METHOD OF PRODUCING THERMOPLASTIC POLYCARBONATE FILMS HAVING LOW OPTICAL RETARDATION VALUES

(75) Inventors: Shu Liu, Pittsburgh, PA (US); Luis A. Colon, Newington, CT (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 349 days.

(21) Appl. No.: 10/301,175

(22) Filed: Nov. 21, 2002

(65) Prior Publication Data

US 2004/0099973 A1 May 27, 2004

(51) Int. Cl.$^7$ .......................... B29D 11/00; B29C 47/92
(52) U.S. Cl. ................ 264/1.34; 264/40.1; 264/210.2; 264/211.12
(58) Field of Search ................................ 264/1.1, 1.34, 264/2.6, 2.7, 40.1, 210.1, 210.2, 211.12, 1.33; 425/363, 810, 327

(56) References Cited

U.S. PATENT DOCUMENTS

| | | | |
|---|---|---|---|
| 4,368,240 A | 1/1983 | Nauta et al. | 428/447 |
| 4,859,392 A | 8/1989 | Vetter | 264/166 |
| 5,076,987 A | 12/1991 | Wank et al. | 264/210.2 |
| 5,244,713 A | 9/1993 | Nakamura et al. | 428/156 |
| 5,286,436 A | 2/1994 | Funk et al. | 264/210.2 |
| 5,561,180 A | 10/1996 | Taketani et al. | 524/108 |
| 5,779,962 A | 7/1998 | Andraschko | 264/210.1 |
| 5,914,150 A | 6/1999 | Porter et al. | 427/77 |
| 6,201,045 B1 | 3/2001 | Koike | 524/81 |
| 6,280,808 B1 | 8/2001 | Fields et al. | 428/64.1 |
| 6,682,805 B1 * | 1/2004 | Lilly | 428/215 |
| 6,773,649 B2 * | 8/2004 | Bourne et al. | 264/210.2 |
| 2003/0099808 A1 | 5/2003 | Coyle et al. | 428/64.4 |

FOREIGN PATENT DOCUMENTS

| | | |
|---|---|---|
| EP | 0 380 028 | 8/1990 |
| EP | 0 916 474 | 5/1999 |
| EP | 0 916 475 | 5/1999 |
| EP | 0 999 031 | 5/2000 |
| WO | 02/066234 | 8/2002 |

* cited by examiner

*Primary Examiner*—Mathieu D. Vargot
(74) *Attorney, Agent, or Firm*—Joseph C. Gil; James R. Franks

(57) ABSTRACT

A method of preparing a thermoplastic polycarbonate film having an optical retardation value of less than or equal to 20 nm, is described. The method includes: (a) forming a molten extrudate (20) of a thermoplastic polycarbonate polymer in an extruder (11) having a terminal die (17) through which the molten extrudate is passed, the molten extrudate having a temperature of 150° C. to 400° C. upon emerging from terminal die (17); and (b) passing molten extrudate (20), from die (17), between two counter-rotating rolls (23 and 26) each having an elastomeric polymer surface (35 and 38), the counter-rotating rolls having a roll speed ratio and a nip (41), the distance between the terminal die (17) and the nip (41) being a die-nip distance (47). The extrudate temperature, the roll speed ratio and the die-nip distance (47) are each selected such that a thermoplastic polycarbonate film (32) having an optical retardation value of less than or equal to 20 nm is formed.

20 Claims, 3 Drawing Sheets

METHOD OF PRODUCING THERMOPLASTIC POLYCARBONATE FILMS HAVING LOW OPTICAL RETARDATION VALUES

DESCRIPTION OF THE INVENTION

The present invention relates to a process of preparing thermoplastic polycarbonate films having low optical retardation values.

The process of the present invention makes use of at least two elastomeric polymer surfaced rolls through which a molten thermoplastic polycarbonate extrudate is passed. In the process of the present invention, the extrudate temperature, the roll speed ratio and the die-nip distance are each selected such that a thermoplastic polycarbonate film having an optical retardation value of less than or equal to 20 nm is formed.

Silica based glass and quartz are often used in many optical and display applications, such as lenses, ophthalmic lenses, optical windows, optical filters and liquid crystal displays. Thermoplastic polycarbonate films offer the advantage of reduced weight and increased impact resistance over glass and quartz. In particular, thermoplastic polycarbonate films provide improved flexibility, relative to glass and quartz, in those applications requiring thin films (e.g., film thicknesses of less than 30 mils).

Thermoplastic polycarbonate films, however, often have undesirably high optical retardation values, e.g., greater than 20 nm, such as 100 nm or 1000 nm. High optical retardation values are associated with an increased level of internal stress within the thermoplastic polycarbonate film, which is believed to be due to increased polymer chain orientation. Increased levels of internal stress can result in undesirable dimensional changes in the film over time, and in particular under conditions of temperature fluctuation. In many optical applications, it is necessary that the films employed be dimensionally stable. In addition, increased optical retardation values are undesirable in those optical applications which make use of polarized light. Such applications include, but are not limited to liquid crystal displays and write/erase opto-magnetic discs.

Thermoplastic polycarbonate films having low optical retardation values (i.e., low birefringence) can be prepared for example by casting methods, in which the film is cast from an organic solvent mixture, e.g., halogenated solvents. Film casting methods are described, for example, in U.S. Pat. No. 5,561,180. Film casting methods are generally undesirable due to environmental concerns associated with the use and disposal of organic solvents, particularly in the case of the large scale production of polycarbonate films, and associated high production costs.

U.S. Pat. No. 5,076,987 discloses a process for the production of optically isotropic extruded polycarbonate films having a path difference of less than 10 nm/mm. The process of the '987 patent involves calendering the polycarbonate film between an elastic roller and a high gloss steel roller.

In accordance with the present invention, there is provided a method of preparing a thermoplastic polycarbonate film comprising:
(a) forming a molten extrudate of a thermoplastic polycarbonate polymer in an extruder having a terminal die through which said molten extrudate is passed, said molten extrudate having a temperature of 150° C. to 400° C. upon emerging from said terminal die;
(b) passing the molten extrudate, from said die, between two counter-rotating rolls each having an elastomeric polymer surface, said counter-rotating rolls having a roll speed ratio and a nip, the distance between said terminal die and said nip being a die-nip distance;

wherein the extrudate temperature, the roll speed ratio and the die-nip distance are each selected such that a thermoplastic polycarbonate film having an optical retardation value of less than or equal to 20 nm is formed.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings.

Unless otherwise indicated, all numbers or expressions, such as those expressing structural dimensions, process conditions, quantities of ingredients, etc. used in the specification and claims are understood as modified in all instances by the term "about."

BRIEF DESCRIPTION OF THE DRAWINGS

In FIGS. 1 through 3, like reference numerals and characters designate the same components, structural features and process streams.

DETAILED DESCRIPTION OF THE INVENTION

Figure 1:
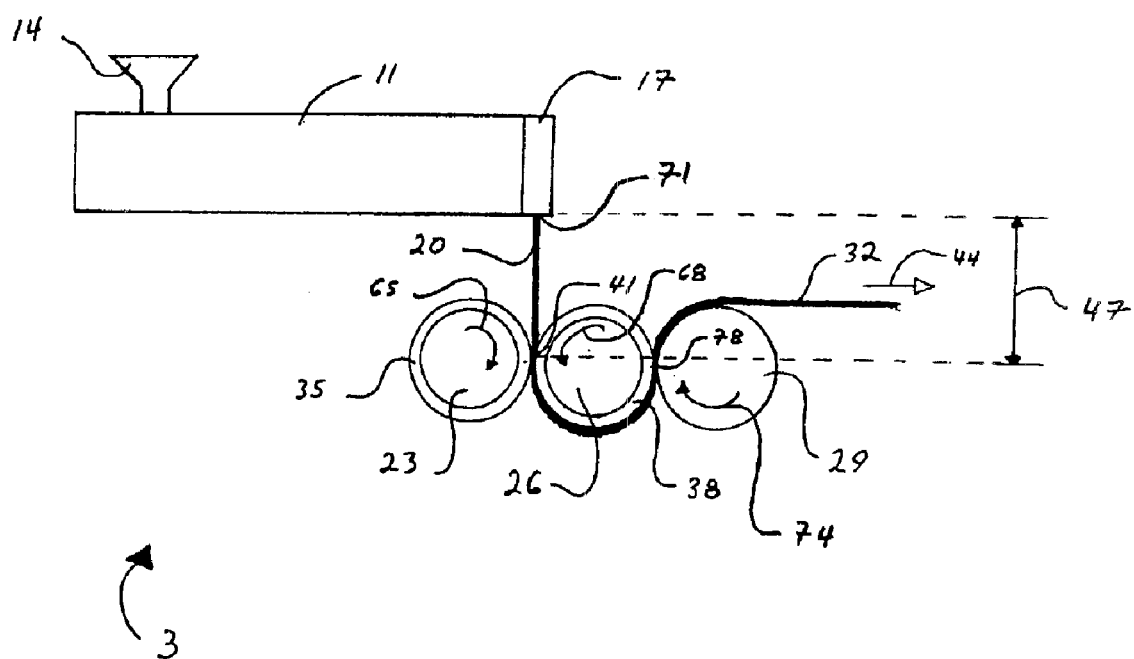
FIG. 1 is a schematic representation of an extrusion process of the present invention.

The thermoplastic polycarbonate polymer that is extruded in the method of the present invention may be selected from those known to the skilled artisan. Classes of thermoplastic polycarbonates that may be used in the present invention include, but are not limited to, thermoplastic aliphatic polycarbonates, thermoplastic aromatic polycarbonates, thermoplastic aliphatic polyester polycarbonates, thermoplastic aromatic polyester polycarbonates and combinations thereof. Preferred classes of thermoplastic polycarbonates include thermoplastic aromatic polycarbonates and thermoplastic aromatic polyester polycarbonates. A particularly preferred class of thermoplastic polycarbonates are the thermoplastic aromatic polycarbonates, e.g., thermoplastic aromatic polycarbonates prepared from bisphenols, such as 4,4'-isopropyl-idenediphenol (bisphenol A). Commercially available thermoplastic polycarbonates that may be used in the present invention include, for example, those from Bayer Corporation, e.g., MAKROLON® 3108 thermoplastic polycarbonate.

In the method of the present invention, a molten extrudate of thermoplastic polycarbonate is formed in an extruder having a terminal die. The extruder may be selected from those known to the skilled artisan, e.g., single screw, twin-screw co-rotating and twin-screw counter-rotating extruders that may be either oil heated or electric heated. Typically a single screw extruder having a series of separately controlled electrically heated zones is used. The terminal die may be configured to expel the molten extrudate directly out of the face of the die. Typically, the terminal die is configured to expel the molten extrudate out of the bottom of the die, such that it drops by means of gravity directly down into the nip of a pair of elastomeric-surfaced counter-rotating rolls positioned below the terminal die.

The molten thermoplastic polycarbonate extrudate emerges from the terminal die of the extruder at a lower temperature value of 150° C., preferably 200° C. and more preferably 243° C. The molten thermoplastic polycarbonate extrudate emerges from terminal die of the extruder at an upper temperature value of 400° C., preferably 350° C. and more preferably 315° C. The molten thermoplastic polycarbonate extrudate emerging from the terminal die of the extruder may have a temperature range selected from any combination of these recited lower and upper temperature values, e.g., 150° C. to 400° C., 200° C. to 350° C. and 243° C. to 315° C.

The temperature of the molten extrudate has an effect on the optical retardation value of the thermoplastic polycarbonate film produced according to the method of the present invention. With the die-nip distance and the roll speed ratio of the counter-rotating rolls each maintained constant, it has been found that as the molten extrudate temperature is increased, the optical retardation value of the thermoplastic polycarbonate film generally decreases. However, if the molten extrudate temperature is too high, thermal degradation of the polymer is more likely to occur.

Upon emerging from the die, the molten extrudate is passed between two counter-rotating rolls. The counter-rotating rolls each have an elastomeric polymer surface. While the counter-rotating rolls may be fabricated substantially from one or more elastomeric polymers, more typically they are fabricated from metal, and the metal surface of the rolls are covered with an elastomeric polymer. As used herein and in the claims, the term "elastomeric polymer" means a polymer having resilient properties, e.g., natural and synthetic rubbers. Rolls having elastomeric polymer surfaces are known to the skilled artisan, and may be fabricated in accordance with art-recognized methods, for example as described in U.S. Pat. No. 4,368,240.

The elastomeric polymer of the counter-rotating rolls may be selected from those known to the skilled-artisan. In an embodiment of the present invention the elastomeric polymer of the rolls is selected from silicone rubber, polytetrafluoroethylene, polypropylene and combinations thereof. In a preferred embodiment of the present invention, the elastomeric polymer is selected from silicone rubber.

The elastomeric polymer surfaces of the counter-rotating rolls each independently have a surface roughness of less than 100 μm. Preferably, the elastomeric polymer surfaces of the counter-rotating rolls each independently have a surface roughness of from 0.01 μm to 50 μm. In selecting elastomeric polymer surfaced rolls having different surface roughness values, it is possible to form films having a smooth or mirror-like surface on one side, and a matte or micro-matte surface on the other side. In an embodiment of the present invention, each of the counter-rotating rolls has substantially the same surface roughness value, which is from 0.01 μm to 50 μm.

The distance between the terminal die, more particularly where the molten extrudate emerges from the terminal die, and the nip of the co-rotating elastomeric polymer surfaced rolls is referred to herein as the die-nip distance. The die-nip distance is typically greater than 2.5 cm and less than 50 cm, and preferably greater than 4 cm and less than 12 cm. In a preferred embodiment, the die-nip distance is from 10 cm and 12 cm, e.g., 11.5 cm.

With the molten extrudate temperature and the roll speed ratio of the counter-rotating rolls each maintained constant, an increase in die-nip distance has been found to generally result in a decrease in the optical retardation values of the film. However, it has also been found that if the die-nip distance is too small (e.g., less than 2.5 cm) or too large (e.g., greater than 50 cm), the optical retardation values of the resulting film will be undesirably high (e.g., greater than 20 nm). In the case of large die-nip distances, and while not intending to be bound by any theory, the undesirably high optical retardation values are thought, at least in part, to be the result of gravity induced orientation, which can occur as the distance, through which the molten extrudate falls, is increased too much. In the case of die-nip distances that are too small, and while not intending to be bound by any theory, the undesirably high optical retardation values are thought, at least in part, to be the result of an insufficient amount of time to allow the polymer chains to relax from an oriented state to a random state.

In addition to selecting the temperature of the molten extrudate and the die-nip distance, the roll speed ratio of the counter-rotating rolls is also selected such that the resulting thermoplastic polycarbonate film has an optical retardation value of less than 20 nm. Typically, the roll speed ratio, i.e., the ratio of the speed at which the rolls are turned, is selected such that the peripheral speed ratio of the rolls is substantially 1:1. The peripheral speed of the rolls can be determined by means of calculation (e.g., measuring the actual radius or diameter of the rolls), or by measuring the peripheral speed of the rollers directly (e.g., by means of a laser).

While not intending to be bound by any theory, it is believed based on the evidence at hand, that peripheral counter-rotating roll speed ratios that deviate from substantially 1:1, result in the introduction of stresses into the forming film, and a corresponding increase in the optical retardation values of the final film. The counter-rotating rolls may be selected such that they have different diameters. Preferably, the counter-rotating rolls are selected such that they have substantially the same diameters. However, small differences in diameter can result from the process by which the rolls are fabricated, or from differential wear during operation of the rolls. Even small deviations in the diameter of the rolls (e.g., a difference in diameter of from 0.01 cm to 0.20 cm between the rolls) have been found to result in films having undesirably high optical retardation values. In an embodiment of the present invention, with counter-rotating rolls that have substantially the same diameter, the roll speed ratio is selected from 0.990:1.000 to 1.100:1.000, and preferably from 1.000:1.000 to 1.004:1.000.

In a particularly preferred embodiment of the present invention: each counter-rotating roll has similar or substantially the same diameter, and the roll speed ratio is selected from 1.000:1.000 to 1.004:1.000 (such that the counter-rotating rolls have a peripheral speed of substantially 1:1); the molten extrudate has a temperature of 243° C. to 315° C.; and the die-nip distance is greater than 4 cm and less than 12 cm, particularly preferably the die-nip distance is 11.5 cm.

The thermoplastic polycarbonate film produced in accordance with the method of the present invention typically has an optical retardation value of less than 20 nm, preferably less than 15 nm and more preferably less than 10 nm. In an embodiment of the present invention, the optical retardation value of the film is equal to or greater than 0 nm (e.g., 0.01 nm) and less than 20 nm (e.g., a value of from 1 nm to 7 nm). As discussed previously herein, low optical retardation values (e.g., less than 20 nm) are indicative of decreased or low levels of internal stress and decreased molecular chain orientation within the thermoplastic polycarbonate film, which is further indicative of films having a desirably high level of dimensional stability. Optical retardation values can be measured by means known to the skilled artisan, e.g., by means of an SCA-1500 Instrument from Strainoptic Technologies, Inc.

The thermoplastic polycarbonate film typically has a film thickness of less than or equal to 1000 μm, e.g., from 50 μm to 1000 μm. Preferably, the thermoplastic polycarbonate film has a film thickness of 75 μm to 800 μm. Each surface of the thermoplastic polycarbonate film independently has a surface roughness value of from 0.01 to 50 μm. In an embodiment, each surface of the thermoplastic polycarbonate has substantially the same surface roughness value, which is from 0.01 to 50 μm.

An embodiment of the method of the present invention will be described with reference to the film formation apparatus 3 of FIG. 1 of the drawings. Thermoplastic polycarbonate feed, typically in form of pellets (not shown), is fed into an extruder 11, by means of a feed port 14. Extruder 11 may be, as discussed previously herein, a single or twin-screw extruder, and typically has a series of separately controlled electrically heated zones (not shown) along the barrel. The thermoplastic polycarbonate feed is conveyed and melted at it passes through extruder 11 and emerges as a molten extrudate 20 from terminal die 17. Molten extrudate 20 drops from terminal die 17 into the nip 41 of counter-rotating rolls 23 and 26, the rotation of which is indicated by arcuate arrows 65 and 68. Counter-rotating rolls 23 and 26 each have an elastomeric polymer surface 35 and 38, e.g., of silicone rubber. The distance between the point 71 where molten extrudate 20 exits terminal die 17 and nip 41 is the die-nip distance 47.

Molten extrudate 20 solidifies as it passes through nip 41 and around roll 26. Typically, the molten extrudate has substantially solidified into film 32 by the time is reaches nip 78 between roll 26 and optional take-up roll 29. Optional take-up roll 29 (which has a rotation counter to that of roll 26 as indicated by arcuate line 74) serves to take the thermoplastic film 32 off of roll 26. Take-up roll 29 may optionally have an elastomeric polymer surface (not shown), but typically has a polished metal surface. Thermoplastic polycarbonate film 32 is taken off of take-up roll 29 and propelled forward, as indicated by arrow 44, for further processing (e.g., cutting and/or trimming) or collection on a collection roll (not shown).

In an embodiment of the present invention, the method comprises (with reference to FIG. 3 of the drawings):

(a) forming a molten extrudate (20) of a thermoplastic polycarbonate polymer in an extruder (11) having a terminal die (17) through which said molten extrudate (20) is passed, said molten extrudate (20) having a temperature of 150° C. to 400° C. upon emerging from said terminal die (17);

(b) passing the molten extrudate (20), from said die (17), between two counter-rotating rolls (23 and 26) each having an elastomeric polymer surface (35 and 38), said counter-rotating rolls (23 and 26) having a roll speed ratio and a nip (41), the distance between said terminal die and said nip (41) being a die-nip distance (47);

(c) forwarding said thermoplastic polycarbonate film (32) from said counter-rotating rolls (23 and 26) as it is formed;

(d) measuring optical retardation values of the forwarded thermoplastic polycarbonate film (e.g., by means of an optical retardation scanning instrument 50); and (e) adjusting at least one of the extrudate temperature, the roll speed ratio and the die-nip distance, such that the forwarded thermoplastic polycarbonate film (32) has an optical retardation value of less than or equal to 20 nm.

Steps (d) and (e) can be performed periodically or continuously. In addition, steps (d) and (e) can be performed: manually; automatically (e.g., manually or by means of feed-back loop 5); or a combination of manually and automatically.

Figure 3:
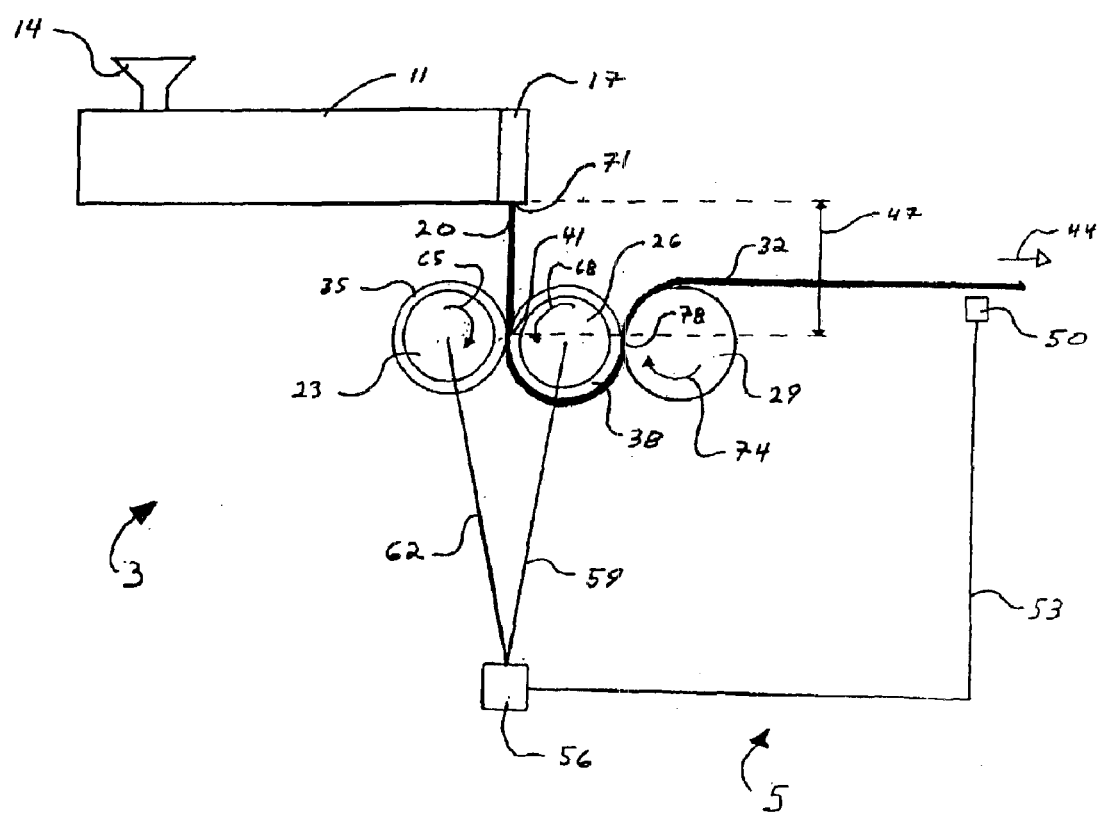
FIG. 3 is a schematic representation of an extrusion process according to the present invention that further includes a feedback loop whereby the roll speed ratio is adjusted in response to the in-line measurement of optical retardation values.

In a preferred embodiment, as represented in FIG. 3, the extrudate temperature and die-nip distance are maintained substantially constant, while the roll speed ratio is adjusted, e.g., either periodically or continuously. With further reference to FIG. 3, the film formation apparatus 3 is coupled with a feed-back loop 5, which includes an in-line optical retardation scanning instrument 50 that is digitally connected by means of data line 53 to a programmable controller 56. Programmable controller 56 is further connected by means of electrical lines 62 and 59 to counter-rotating rolls 23 and 26. Optical retardation data is taken periodically or continuously as film 32 passes by scanner 50. The optical retardation data is transmitted from scanner 50 to programmable controller 56 by means of data line 53. The optical retardation data is compared to preset values within controller 56. If the optical retardation values are too high, then the roll speed ratio of rolls 23 and 26 are adjusted by means of electrical lines 62 and 59. The comparison of optical retardation data and adjustment of the roll speed ratios can be done periodically or continuously. In addition, such comparison and adjustment can be done manually in the absence of controller 56.

In a further embodiment of the present invention, programmable controller 56 can be attached to at least one of: rolls 23 and 26 (for purposes of adjusting the roll speed ratio); extruder 11 (for purposes of adjusting the temperature of the molten extrudate); and a means of elevating/lowering rolls 23 and 26, not shown (for purposes of adjusting die-nip distance 47). Controller 56 can be attached to extruder 11 and/or the means of elevating/lowering rolls 23 and 26 by means of additional electrical connections (not shown).

The thermoplastic polycarbonate films prepared in accordance with the method of the present invention may include additives, selected from, for example: light stabilizers, UV stabilizers, thermal stabilizers, antioxidants, dyes, waxes and combinations thereof. Such additives are typically present in amounts of less than 20 percent by weight, for example from 0.01 to 15 percent by weight, or 0.1 to 5 or 10 percent by weight, the percent weights being based on the weight of the thermoplastic polycarbonate film. The additives are typically incorporated into the film during the extrusion process, in accordance with art-recognized methods.

The thermoplastic polycarbonate films prepared in accordance with the method of the present invention may be used in many applications, including those requiring films having low optical retardation values, for example, liquid crystal displays, write/erase opto-magnetic discs.

The present invention is more particularly described in the following examples, which are intended to be illustrative only, since numerous modifications and variations therein will be apparent to those skilled in the art. Unless otherwise specified, all parts and percentages are by weight.

EXAMPLES

In the following examples the thermoplastic polycarbonate used was MAKROLON® 3108 thermoplastic polycarbonate, a bisphenol-A based polycarbonate commercially available from Bayer Corporation in pellet form, having a melt flow rate of 6.5 grams/10 minutes (as determined at 300° C. with a 1.2 kg load, in accordance with ASTM D 1238). An electrically heated single screw extruder having a screw diameter of 90 mm and an L/D ratio of 30, was used. The polycarbonate was fed into the extruder at a rate of 2.6 kg/minute.

In the following examples an extruder/roller configuration 3 similar to that depicted in FIG. 1 was used. With reference to FIG. 1, rolls 23 and 26, through which the molten extrudate 20 was passed, each had an elastomeric surface (35 and 38) of silicone rubber having a shore A hardness of 80 and a surface roughness value (Ra) of 10 $\mu$m. Each of rolls 23 and 26 had a diameter of approximately 203 mm. Rolls 23 and 26 were operated at a contact pressure of 0.4 MPa. Roll 29, upon which film 32 was taken up off of roll 26, had a polished stainless steel surface and a diameter of approximately 203 mm. Separate heat exchange fluid streams having temperatures of 32° C., 57° C. and 140° C. were continually pumped through each of rolls 23, 26 and 29 respectively. However the surface temperatures of rolls 23, 26 and 29 were not monitored. Both surfaces of the thermoplastic polycarbonate film produced in the following examples each had a surface roughness (Ra value) of 10 $\mu$m.

Optical retardation values were determined using a SCA-1500 instrument system from Strainoptic Technologies, Inc., in accordance with the manufacturer's operating instructions. Optical retardation values are recited in units of nanometers (nm).

Example 1

The affect of roll speed ratio on the optical retardation values of an extruded thermoplastic polycarbonate film is demonstrated in the present example.

Figure 2:
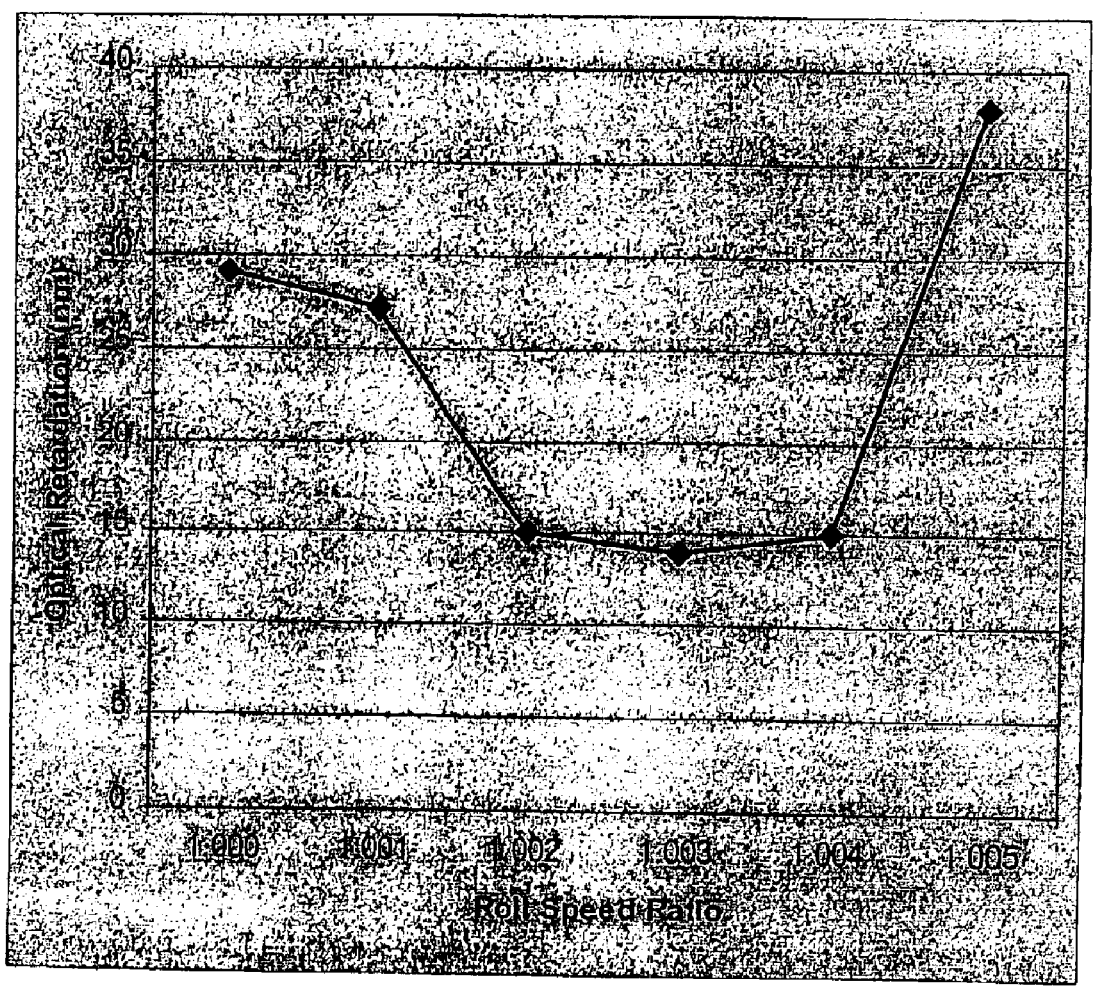
FIG. 2 (which is referred to in the Examples herein) is a graph showing a plot of optical retardation versus roll speed ratio in the extrusion formation of a thermoplastic polycarbonate film at substantially constant extrudate temperature and constant die-nip distance.

With reference to FIG. 1, the roll speed ratio of rolls 23 and 26 was adjusted between 1.000 and 1.005 during the extrusion formation of thermoplastic film 32. Samples of extruded polycarbonate film were collected and later analyzed to determine their optical retardation values. Throughout the evaluation, the temperature of the molten polycarbonate extrudate 20 was 271° C., and the die-nip distance 47 was 11.5 cm. The optical retardation values of the polycarbonate film as a function of roll speed ratio were plotted, and is shown in FIG. 2. The thermoplastic polycarbonate film had a thickness of 127 $\mu$m.

With reference to FIG. 2, a roll speed ratio of from 1.002 to 1.004 results in desirable optical retardation values of approximately 15 nm. Roll speed ratios outside of this range result in undesirably high optical retardation values.

Example 2

The affect of die-nip distance on the optical retardation of an extruded thermoplastic polycarbonate film is demonstrated in the present example.

Throughout the evaluation, the temperature of the molten polycarbonate extrudate 20 was 272° C., and the roll speed ratio of rolls 23 and 26 was 1.003. The extruded polycarbonate film 32 had a thickness of 250 $\mu$m. At a die-nip distance of 3.8 cm the optical retardation of the extruded polycarbonate film was 22 nm. At a die-nip distance of 11.5 cm, the optical retardation of the extruded polycarbonate film was 14 nm.

Example 3

A thermoplastic polycarbonate film was extruded in accordance with the process of the present invention under the following conditions: molten polycarbonate extrudate temperature of 254° C.; roll speed ratio of 1.003; and a die-nip distance of 11.5 cm. The extruded thermoplastic polycarbonate film had a thickness of 127 $\mu$m, and an optical retardation value of 5 nm.

The present invention has been described with reference to specific details of particular embodiments thereof. It is not intended that such details be regarded as limitations upon the scope of the invention except insofar as and to the extent that they are included in the accompanying claims.

What is claimed is:

1. A method of preparing a thermoplastic polycarbonate film comprising:
   (a) forming a molten extrudate of a thermoplastic polycarbonate polymer in an extruder having a terminal die through which said molten extrudate is passed, said molten extrudate having a temperature of 150° C. to 400° C. upon emerging from said terminal die; and
   (b) passing the molten extrudate, from said die, between two counter-rotating rolls each having an elastomeric polymer surface, said counter-rotating rolls having a roll speed ratio and a nip, the distance between said terminal die and said nip being a die-nip distance;
   wherein the extrudate temperature, the roll speed ratio and the die-nip distance are each selected such that a thermoplastic polycarbonate film having an optical retardation value of less than or equal to 20 nm is formed.

2. The method of claim 1 wherein said thermoplastic polycarbonate film has an optical retardation value of less than or equal to 15 nm.

3. The method of claim 1 wherein said thermoplastic polycarbonate film has an optical retardation value of less than or equal to 10 nm.

4. The method of claim 1 wherein the elastomeric polymer surface of each of said rolls is selected independently from silicone rubber, polytetrafluoroethylene and polypropylene.

5. The method of claim 1 wherein said elastomeric polymer surface of each of said rolls independently has a surface roughness of from 0.01 $\mu$m to 50 $\mu$m.

6. The method of claim 1 wherein each surface of said thermoplastic polycarbonate film independently has a surface roughness value of from 0.01 $\mu$m to 50 $\mu$m.

7. The method of claim 1 wherein said thermoplastic polycarbonate film has a thickness of from 50 $\mu$m to 1000 $\mu$m.

8. The method of claim 1 wherein the die-nip distance is greater than 2.5 cm and less than 50 cm.

9. The method of claim 1 wherein the roll speed ratio is selected such that said rolls have a peripheral speed ratio of substantially 1:1.

10. The method of claim 9 wherein said roll speed ratio is selected from 0.990:1.000 to 1.100:1.000.

11. The method of claim 1 wherein the temperature of said molten extrudate is 243° C. to 315° C.

12. The method of claim 11 wherein the die-nip distance is greater than 4 cm and less than 12 cm, and the roll speed ratio is selected such that said rolls have a peripheral speed ratio of substantially 1:1.

13. The method of claim 12 wherein the die-nip distance is 11.5 cm.

14. A method of preparing a thermoplastic polycarbonate film comprising:

(a) forming a molten extrudate of a thermoplastic polycarbonate polymer in an extruder having a terminal die through which said molten extrudate is passed, said molten extrudate having a temperature of 150° C. to 400° C. upon emerging from said terminal die;

(b) passing the molten extrudate, from said die, between two counter-rotating rolls each having an elastomeric polymer surface, said counter-rotating rolls having a roll speed ratio and a nip, the distance between said terminal die and said nip being a die-nip distance;

(c) forwarding said thermoplastic polycarbonate film from said counter-rotating rolls as it is formed;

(d) measuring optical retardation values of the forwarded thermoplastic polycarbonate film; and (e) adjusting at least one of the extrudate temperature, the roll speed ratio and the die-nip distance, such that the forwarded thermoplastic polycarbonate film has an optical retardation value of less than or equal to 20 nm.

15. The method of claim 14 wherein steps (d) and (e) are each performed continuously.

16. The method of claim 15 wherein the extrudate temperature and die-nip distance are substantially constant, and the roll speed ratio is adjusted continuously.

17. The method of claim 16 wherein the roll speed ratio is adjusted such that said rolls have a peripheral speed ratio of substantially 1:1.

18. The method of claim 14 wherein the elastomeric polymer surface of each of said rolls is selected independently from silicone rubber, polytetrafluoroethylene and polypropylene.

19. The method of claim 14 wherein die-nip distance is greater than 2.5 cm and less than 50 cm, and the temperature of said molten extrudate is 243° C. to 315° C.

20. The method of claim 19 wherein steps (d) and (e) are each performed continuously, the extrudate temperature and die-nip distance are substantially constant, and the roll speed ratio is adjusted continuously such that said rolls have a peripheral speed ratio of substantially 1:1.

* * * * *